June 5, 1951        L. B. SCHOUBOE        2,555,663
HITCH FOR WRECKING TRUCKS
Filed Aug. 14, 1948        2 Sheets-Sheet 1
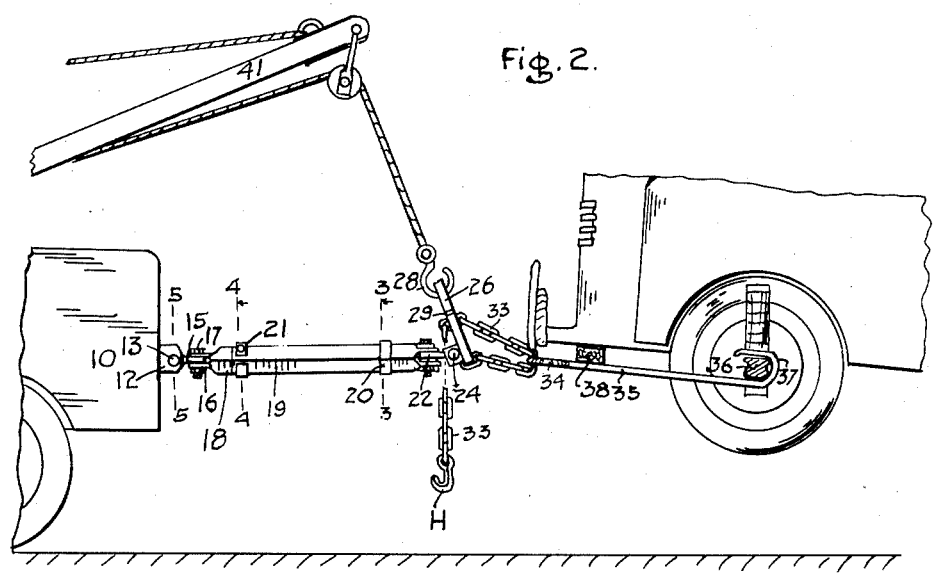
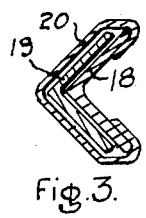
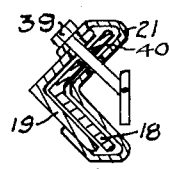
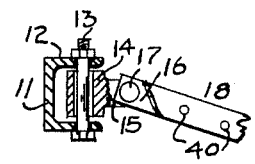
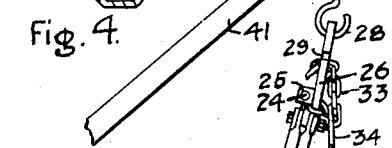
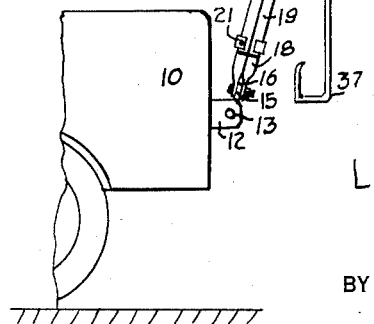
Leonard B. Schouboe
INVENTOR
BY
ATTORNEY June 5, 1951          L. B. SCHOUBOE          2,555,663
HITCH FOR WRECKING TRUCKS
Filed Aug. 14, 1948          2 Sheets-Sheet 2
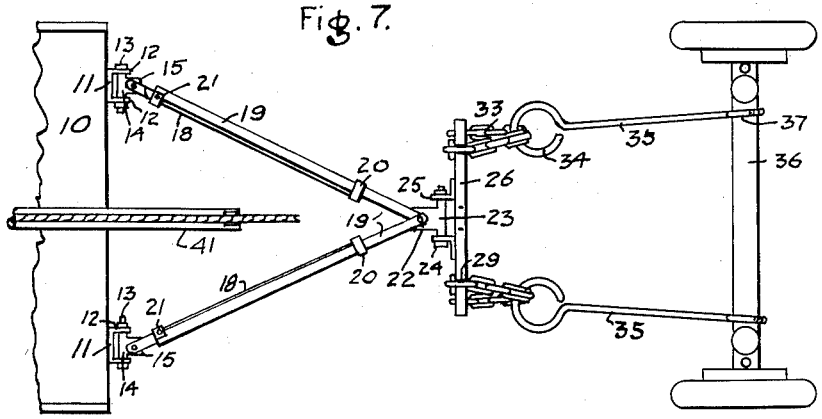
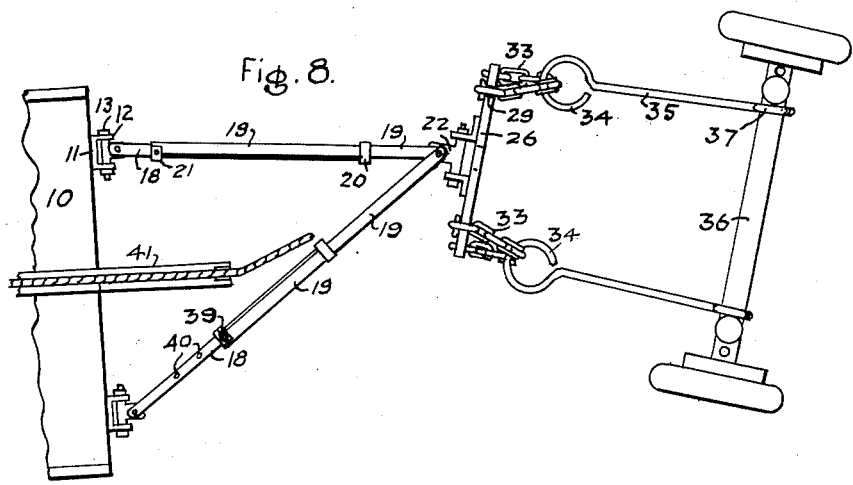
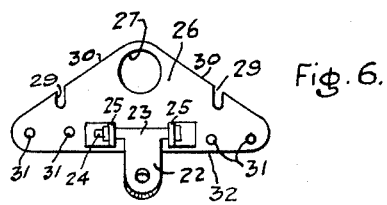
Leonard B. Schouboe
INVENTOR
BY
ATTORNEY Patented June 5, 1951

2,555,663

UNITED STATES PATENT OFFICE 2,555,663

HITCH FOR WRECKING TRUCKS

Leonard B. Schouboe, Tacoma, Wash.

Application August 14, 1948, Serial No. 44,255

15 Claims. (Cl. 214—86)

This invention relates to the apparatus by which a disabled automobile is connected to the wrecker truck to be towed away for repairs.

There have been many attempts at producing a convenient hitch for car wreckers, but most of them have been too heavy and complicated and expensive to be practical for use by the usual service station, and require too much time in making or releasing the connection with the wrecked car. Also many of them are not adapted for picking up a car when it is on a side hill or at an awkward angle.

The purposes of my invention are to provide an apparatus which will enable the wrecker to pick up the wrecked car in a matter of seconds after its arrival at the scene; which will hold the apparatus in extended position while connection with the wrecked car is being made; which will hold the wrecked car at a substantially fixed relative distance from the wrecker while being towed; which provides a bumper to hold the car back from the truck when traveling down grade or while backing; which provides universal joints to attain flexibility in order to accommodate changes in the vertical and horizontal relative positions of the truck and car in traveling or in picking up the wrecked car on a hillside or in various angles; which will automatically adjust itself for passing around curves; which will not damage the car in any particular; which can pick up the wrecked car from either end; and can be set to tow a car around a sharp curve, as in a ramp garage.

In utilizing my hitch, wrecked cars are readily and expeditiously raised and towed by the towing vehicle. When the wrecking truck on which my hitch is attached reaches the scene of the collision or accident, it is a very simple matter, and one that requires only a few moments, to attach my hitch to the wrecked vehicle and readily and properly tow the same, either in a straight line or around curves or on ramps in garages. This is all accomplished by a very simple mechanism which includes a substantially V-shaped telescopic frame that has the inner ends of the V-frame universally secured and at spaced points to the rear portion or end of the towing truck and adjacent the opposite sides thereof so as to maintain the substantially V-shape of the frame the outer ends of which are overlapped and are universally attached to a buffer and lifting plate which may assume any particular outline or shape but herein is shown as being of triangular outline and substantially flat. This plate provides the means for enabling the hook or other attaching device of the wrecking car to be associated therewith and lifted by suitable lifting mechanism on the wrecking car and additionally the plate has secured thereto at opposite points lengths of flexible chain or the like, and any desired length of chains that are attached to the plate may be used and on each of these chains there is carried a hook bar that is preferably elongated. One end of each of the bars is actually in the form of a hook and the other ends of the bars are in the form of eyes or rings that enable the same to be carried by the flexible chains or the like.

With this combination of component elements, applicant's hitch may be associated with the wrecked car in a matter of moments by simply elongating the telescopic frame, if necessary, by pulling it outwardly, and consequently the plate that is attached thereto will also extend outwardly and then simply taking each of the hooks that are carried on the chains and inserting them beneath the wrecked car or any car that is to be towed, and engaging the hooked ends of the bars over the axle or any other rigid part of the under-structure of the car. Then the free ends of the chains are simply looped and dropped into notches or other securing and fastening means on the plate. It will be seen that this requires only a matter of moments and when the hooks have been thus attached, it is simply necessary then for the attendant to raise the hitch by means of the hoisting mechanism on the towing car, which usually includes a flexible element and a hook to engage the said plate, and this hoisting will bring the plate in close proximity with the bumper or other front structure of the car that is to be towed and, due to the universal movement that is allowed by the frame connection with the towing truck and with the plate, and assuming that the hoisting mechanism on the towing truck has been utilized, the telescopic frame will be telescoped from an extended position to a retracted one and the hoist that is attached to the plate will maintain the plate and the frame in their proper positions, both with respect to the towing car and the car that is being towed.

This hitch can be attached to a wrecked car no matter whether the car is at an angle or diagonally disposed with regard to the wrecking truck or whether the wrecked car is in a ditch or on a hillside, because the amount of space that is required for the hooks to get beneath the car is practically negligible and there is no necessity for the use of separate jacks or other hoisting means for raising the wrecked car so that the hitch can be attached, as must be done in order to utilize the prior art hitches.

I attain these and other purposes by the devices, mechanisms, and arrangements illustrated in the accompanying drawings, in which—

Fig. 1 shows my mechanism mounted on the rear end of the wrecker truck and in idle position; Fig. 2 is a side elevation showing a truck equipped with my apparatus and towing a wrecked car; Fig. 3 is a vertical cross-section of one leg of the telescoping frame, taken on the line 3—3 in Fig. 2; Fig. 4 is a similar view taken on the line 4—4 in Fig. 2 and showing the angle irons secured in non-sliding position by a toggle bolt; Fig. 5 is a horizontal section of one of the universal joints, taken on the line 5—5 in Fig. 2; Fig. 6 is a front elevation of the buffer and lifting plate; Fig. 7 is a plan view illustrating the positions of the parts in normal towing; and Fig. 8 is a similar view illustrating picking up a wrecked car from an angle and also in swinging around a sharp curve, as in a ramp garage.

Identical numerals of reference refer to the same parts in the several views.

Referring to the drawings, the wrecker truck 10 is provided with two hinge elements 11, secured in substantially horizontally spaced alignment at or adjacent the ends of the rear member or portion of the truck. These elements 11 are provided with rearward extending vertical spaced ears 12, through which the horizontal hinge pintle 13 passes (Fig. 5). This pintle 13 passes through the second member 14 of the hinge which is disposed between the said ears. This member 14 can therefore freely swing in a vertical plane. The member 14 is provided with a laterally extending tongue 15, which passes between the jaws 16 formed by the twisted ends of the inner member of the telescoping frame, hereinafter described.

The two hinges, thus formed, form a base of the universally movable triangular or V-shaped telescoping frame, which is composed of two telescoping legs, each composed of two relatively sliding angle irons. The frame, thus formed, is fastened to the said hinge members 14 by vertically disposed pins 17 passing through the jaws 16 and the tongues 15, and is therefore free to swing both in a horizontal direction about the pin 17, and in a vertical direction about the pintle 13.

The two angle irons 18 of the frame legs, which are thus fastened in substantially horizontally spaced relation to the tail end of the truck 10, are tipped about their axes so that the legs thereof lie at 45° to the horizontal and vertical (Figs. 3, 4) with their angle lying outward from the central axis of the truck.

A second pair of similar angle irons 19 complete the triangular or V-shaped frame and are slidably mounted on and adjacent to the above angle irons 18, on the outer sides thereof. Each angle iron 18 is provided at its rearward end with a strap or loop 20 (Fig. 3) welded thereto and encircling the outer surface of the angle iron 19, while the angle iron 19 is provided at its forward end with a similar strap or loop 21 (Fig. 4) welded thereto and encircling the inner surface of the angle iron 18; thus the two angle irons 18 and 19 are held together in sliding or telescoping arrangement.

The ends of two outer angle irons 19 are each provided with an opening and overlapped to align the said openings and with the spaced universal pivoting or mounting of the ends of the angle irons 18 to the rear portion of the two trucks forming the V-shaped frame. The said overlapped ends of the angle irons are each pivotally secured together and to a tongue 22 by means of a vertically disposed bolt or the like that passes through the said openings in the angle irons 19 and the tongue. This tongue 22 is similar to the tongues 15 on the hinge members 14 (Fig. 5). This tongue 22 extends forward from a hinge member 23 which is pivotally mounted on the bolt 24, between two spaced brackets 25 extending from the buffer and lifting plate 26 (Fig. 6), whereby a universal joint is provided.

The plate 26 is substantially flat and of general triangular outline, and has at its apex an opening 27 adapted to receive the hoisting hook 28 of the wrecker truck 10. Two slots or notches 29 are made, in corresponding positions, in the two inclined sides 30 of the plate 26. One or more holes 31 are made on each side of the center of the lower horizontal edge 32 of the plate 26, said holes being adapted to receive and have secured thereto the end links of the two elongated flexible chains 33 or the like, while the slots 29 are adapted to receive any link of the said chains, thus making chain loops that are adjustable in length. This lifting plate 26 also functions as a bumper for the car in traveling down grade, or in backing. A hook H, see Fig. 2, is attached to the end of each of the chains 33. These hooks serve, under certain circumstances, as means for attaching the free end of the chain to a selected link of the chain to form the loop whereby the hook bars 35 are maintained in proper relationship with the chains.

Each chain 33 passes through a ring 34 formed on the end of an elongated hook bar 35, said hook bar being long enough to pass under the wrecked car and engage the car axle 36 or to engage any other suitable accessible part or component of the car. The outer ends of the hook bars 35 are bent back at 37 to pass under, behind, and over the said axle 36 or other part of the wrecked car. A block 38, of suitable dimensions may be placed on top of the bars 35 and under the chassis framing, near the car radiator, or at any other convenient position, and protects aprons or other parts from lifting strains, or any damage to the car.

A removable toggle bolt 39 may be passed through the angle iron 19 and any one of a series of holes 40 made in the angle iron 18, and the strap or loop 21 (Fig. 4) to hold said angle irons in extended position. In normal hauling both said angle irons 19 are telescoped in relation to the angle irons 18 (Figs. 2, 7), but in passing around sharp curves, as in a ramp garage, or in parking, it may be necessary to thus swing the lifting plate 26 to one side or the other, as illustrated in Fig. 8 and this is accomplished by removing the toggle bolt 39, thus allowing one angle iron 18 to be extended relative to its complemental angle iron 19, or vice versa.

My improved wrecker hitch is operated in the following manner: When the wrecker truck 10 is proceeding to the wreck, the hoisting hook 28 is drawn up to the top of the wrecking boom 41 (Fig. 1) and supports the plate 26, with its chains 33, and hook rods 35 (which however may be detached therefrom if desired) and with the rearward ends of the telescoping frame depending therefrom, the hinge pieces 14 having thus been turned upward on the horizontally disposed pintles 13. When the wrecker truck 10 has reached its proper position in relation to the wrecked car, the hook 28 is lowered and the telescoping frame is extended after the toggle bolts are removed until the plate 26 is close to the disabled car. Then the hook bars 35 are passed under the axle and hooked over it. Then the chains 33 are tightened and anchored in the notches 29 in the plate 26, and when these parts are fully secured and if desired the block 38 is inserted under the car, the hoisting tackle may be operated to raise the front end or the rear end of the car as the case may be and to draw the car towards the truck, telescoping the frame (Figs. 2, 7).

The hitch has now been completed and the truck may proceed to the repair shop. As it does so, it is evident that the plate 26 will act as a buffer between the car and the end of the telescoping frame, and that the several compound joints of the telescoping frame with the tow truck or with the plate 26 will permit perfectly free vertical and lateral motion of the car in relation to the truck and vice versa, while firmly holding the car in trailing position and protecting it from damage from or to the wrecking truck and its apparatus.

If it is desired to turn around a very sharp curve, as in a ramp garage, the car may be swung laterally to one side or the other by extending one of the legs of the telescoping frame (Fig. 8) and holding it in such position by inserting the toggle bolt 39 through one of the holes 40 in the front angle iron 18, thus changing the frame from an isosceles triangle to a distorted triangular or V-shaped condition.

The tension of the hoisting cable normally holds the frame in telescoped position, but allows slight motion laterally when a corner is being turned.

It is, of course, to be understood that changes may be made in the details of construction of my improved wrecker hitch without departing from the spirit of my invention as outlined in the appended claims.

From the foregoing, it is believed clear that the chains or similar flexible means with the hook bars movably associated therewith constitute an important feature of my invention. The hook bars that are movably associated with or carried by each of the chains, are readily insertable beneath the wrecked vehicle and can engage any structural part thereof and the chains are then looped backwardly and the end or end portions of the chains are properly secured thus preventing the hook bars from accidental disassociation from the chains and enabling the hoist means carried by the wrecking or towing truck to readily perform its function in raising the wrecked vehicle and proper towing of same.

Having described my invention, what I claim and desire to secure by Letters Patent, is:

1. In a wrecker hitch, a triangular frame composed of two legs extending from the wrecker truck, each leg composed of two angle irons, one said angle iron of each leg being universally mounted and based on the wrecker truck, the other said angle iron of each leg being pivotally secured to the corresponding angle iron of the other leg to form the apex of the triangle, the second said angle iron lying in contact with the first angle iron; a strap secured to the rearward end of the first angle iron and enveloping said second angle iron; a complementary strap secured to the forward end of said second angle iron and enveloping said first angle iron, whereby each said leg is telescopic in length and said frame is rendered flexible; a lifting plate universally secured to the apex of said frame; and means to secure said lifting plate to the axle of the wrecked car.

2. In combination, a towing mechanism consisting of a substantially V-shaped frame including two arms, a substantially flat plate having on one face thereof a universal bracket to which the apex of the V-shaped frame is pivotally attached, the towing truck having spaced brackets for universal movement on a rear portion thereof, to each of which brackets the free ends of the arms of the frame are pivotally attached, elongated flexible means secured in spaced relation to each other on the plate and adapted to extend away from the other face of the said plate, elongated hook bars slidably carried on each of the said flexible means, the said plate being provided with means whereby an unsecured portion of the said flexible means can be removably secured thereto with the said flexible means in a looped formation and with the said hook bars freely held in the looped formation of the said flexible means.

3. A towing mechanism as defined in and by claim 2 wherein the said flexible means is in the form of elongated chains.

4. A towing mechanism as defined in and by claim 2 wherein the arms constituting the substantially V-shaped frame are telescopic.

5. A towing mechanism as defined in and by claim 2 wherein the said arms constituting the said frame are telescopic and the said flexible means is in the form of individual elongated chains.

6. A towing mechanism as defined in and by claim 2 wherein the said arms constituting the substantially V-shaped frame are of angle iron construction and are telescopic.

7. A towing mechanism as defined in and by claim 2 wherein the said arms constituting the substantially V-shaped frame are of angle iron construction and are telescopic and wherein the said flexible means is in the form of elongated chains.

8. A hitch comprising a substantially V-shaped frame including two arms, a substantially flat plate pivotally attached to the apex of the V-shaped frame, the free ends of the arms being adapted for connection to the rear portion of a towing vehicle, substantially similar individual elongated flexible means each secured at one of its ends to the plate in spaced relation with respect to each other with the remainder of each flexible means being free and adapted to extend away from the plate, elongated towed-vehicle-engageable hook bars movably carried on each of the flexible means, whereby the free ends of the flexible means may be looped and detachably secured to maintain each hook bar on its respective flexible means.

9. A hitch as defined in and by claim 8 wherein the said flexible means is in the form of elongated chains.

10. A hitch as defined in and by claim 8 wherein the arms constituting the substantially V-shaped frame are telescopic.

11. A hitch as defined in and by claim 8 wherein the said arms constituting the said frame are telescopic and the said flexible means is in the form of individual elongated chains.

12. A hitch as defined in and by claim 8 wherein the said arms constituting the substantially V-shaped frame are of angle iron construction and are telescopic.

13. A hitch as defined in and by claim 8 wherein the said arms constituting the substantially V-shaped frame are of angle iron construction and are telescopic and wherein the said flexible means is in the form of elongated chains.

14. A hitch as defined in and by claim 8 wherein spaced notches opening outwardly of an edge of the flat plate are provided, whereby an end portion of each of the flexible means may be detachably secured therein.

15. A towing mechanism as defined in and by claim 2 wherein spaced notches opening outwardly of an edge of the flat plate are provided, whereby an end portion of each of the flexible means may be detachably secured therein.

LEONARD B. SCHOUBOE.

REFERENCES CITED

The following references are of record in the file of this patent:

UNITED STATES PATENTS

| Number | Name | Date |
| --- | --- | --- |
| 643,933 | Bender | Feb. 20, 1900 |
| 1,254,804 | Holmes | Jan. 29, 1918 |
| 1,657,655 | Ashton | Jan. 31, 1928 |
| 1,690,372 | Livesay | Nov. 6, 1928 |
| 1,783,189 | Green | Dec. 2, 1930 |
| 2,045,793 | Pearson et al. | June 30, 1936 |
| 2,183,478 | Holmes et al. | Dec. 12, 1939 |
| 2,283,443 | Klein | May 19, 1942 |